J. CASE.
Wheel-Cultivator.

No. 53,947.

Patented Apr. 17, 1866.

Witnesses:
P. T. Dodge
R. F. Rumbuck

Inventor:
Jarvis Case
By his Attorney
W. C. Dodge

UNITED STATES PATENT OFFICE.

JARVIS CASE, OF SPRINGFIELD, OHIO.

IMPROVEMENT IN CULTIVATORS.

Specification forming part of Letters Patent No. 53,947, dated April 17, 1866.

*To all whom it may concern:*

Be it known that I, JARVIS CASE, of Springfield, in the county of Clarke and State of Ohio, have invented certain new and useful Improvements in Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1:
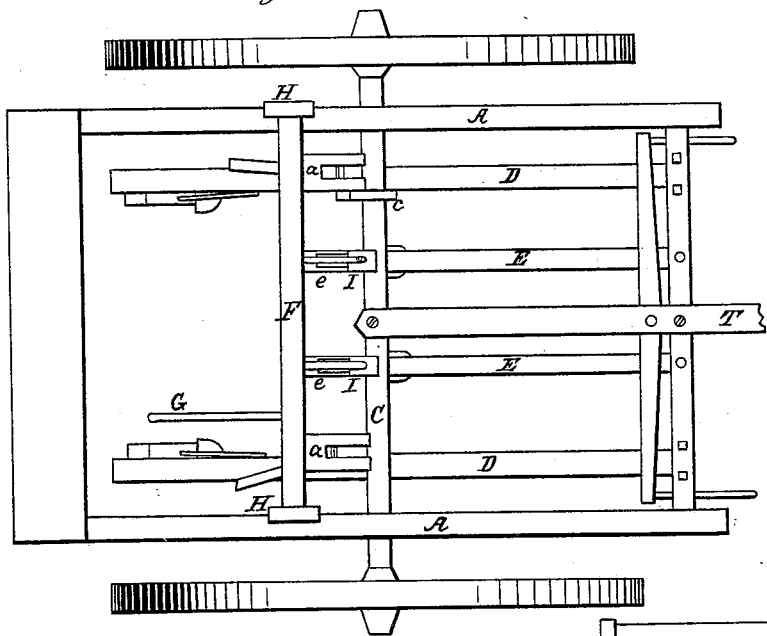
Figure 3:
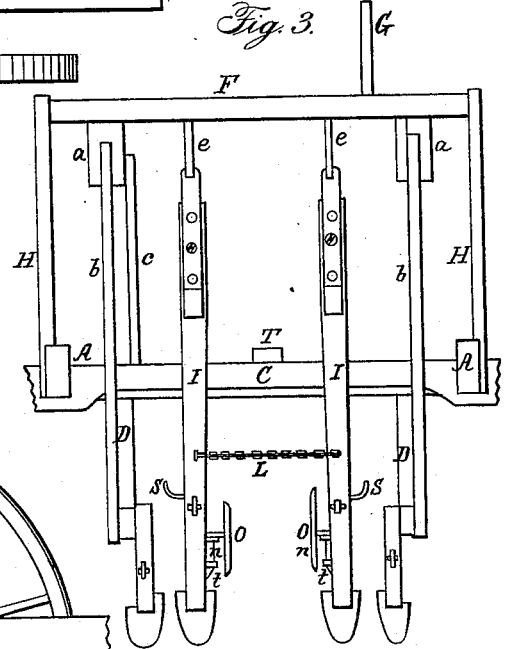
Figure 2:
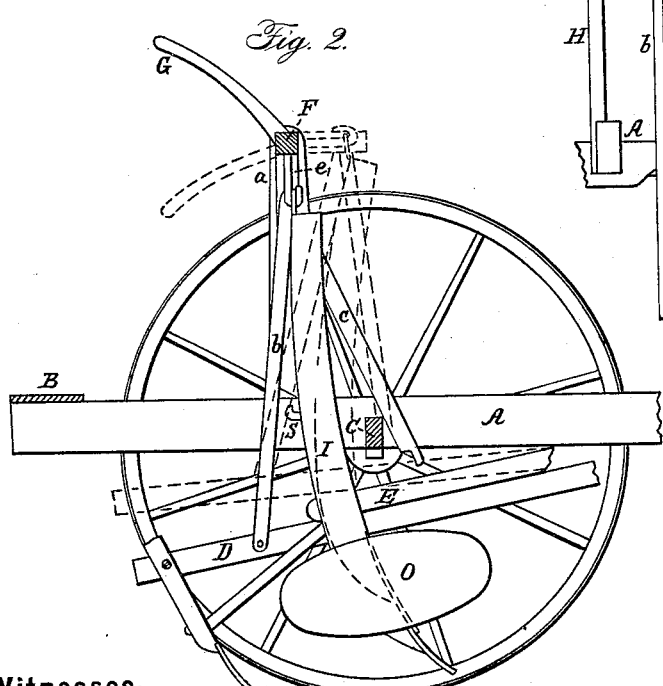

Figure 1 is a top-plan view; Fig. 2, a longitudinal vertical section; Fig. 3, a rear elevation.

Similar letters indicate like parts in the various figures.

My invention consists in a novel arrangement of hanging and operating the various parts of the implement.

A represents the frame, constructed in any suitable form, mounted on two wheels, and having a tongue, T, secured rigidly to the frame, as shown in Fig. 1.

B represents a seat secured to the rear end of the frame, upon which the driver sits.

To each side of the main frame A, just in rear of the axle, a vertical post, H, is secured, and secured to the top of these posts is a transverse rock-shaft, F, having arms $a$ $a$ projecting therefrom directly over the outer plow-beams, D, a bar or rod, $b$, serving to connect the beams D to the arms $a$, the bar $b$ being pivoted at each end, so as to permit the rock-shaft F to be turned by the lever G, and thus raise or lower the plows, the beams D having no lateral motion.

E represents two inner plow-beams, pivoted to the front of the frame A by an eyebolt or universal joint, so as to give to said beams E both a vertical and a lateral movement. The plow-standards I, which are attached to the rear end of the beams E, extend up, as shown in Fig. 2, and are attached to the rock-shaft F by rods or arms $e$.

L represents a chain, by which the two standards I may be united, as shown in Fig. 3 A rest or stirrup for the foot, as represented by $s$, projects from the side of each of the standards I, by which they may be moved laterally to and fro, as may be required to suit the irregularities of the row. By using a chain instead of a rigid bar or rod for this purpose the plows attached to the standards I may be brought nearer together, but are prevented from being spread farther apart. When it is desired, however, the chain may be released at one end, in which case the standards I, with their plows, can be moved independently of each other, as may be desired.

A bar, $c$, is pivoted at its upper end to one of the arms $a$, as shown in Figs. 2 and 3, its lower end being notched, as shown in Fig. 2. This bar is of such a length that when the plows are raised from the ground by drawing down the lever, as shown in red in Fig. 2, the shoulder formed by the notch at the lower end of bar $c$ will engage or rest upon the top of the axle C, and thus hold the plows suspended from the ground. By having the bar $c$ inclined, as shown, its lower end is thrown back by its gravity, so that when raised its lower end is made to automatically lock upon the axle and hold the plows up. When it is desired to let the plows down the driver simply pushes the end of the bar $c$ off the axle, and the shaft F turns in its bearings and lets the plows down.

O represents a shield, one being attached to each of the standards I, to protect the young plants from clods, &c. These shields O are secured in position by means of the elbow-irons $n$, which are made square or rectangular in their cross-section and fit into corresponding staples $t$, which serve to hold them securely in place and at the same time permit them to be readily detached when not required for use.

Having thus described my invention, what I claim is—

1. Suspending the plow-beams from the rock-shaft F mounted on the posts H, substantially as shown and described.

2. The lock-bar or brace $c$, arranged to operate in connection with the shaft F, as and for the purpose set forth.

3. The standards I, connected by the chain L and provided with the foot-rests $s$, as shown and described.

4. Attaching the shields O by means of the bent arms $n$ and staples $t$, as set forth.

JARVIS CASE.

Witnesses:
REUBEN MILLER,
G. W. DALIS.